United States Patent [19]

Cann

[11] 4,343,752

[45] Aug. 10, 1982

[54] SYNTHETIC ONYX AND METHOD

[76] Inventor: Irving Cann, c/o Roman Marble, Inc., 15 Rusfield St., Boston, Mass. 02119

[21] Appl. No.: 180,461

[22] Filed: Aug. 22, 1980

Related U.S. Application Data

[63] Continuation of Ser. No. 965,078, Nov. 30, 1978, abandoned.

[51] Int. Cl.[3] ........................ B29C 9/00

[52] U.S. Cl. ........................ 264/71; 264/69; 264/73; 264/74

[58] Field of Search ........................ 264/73, 74, 69, 71

[56] References Cited

U.S. PATENT DOCUMENTS

| | | | |
|---|---|---|---|
| 1,204,378 | 11/1916 | Spencer | 264/74 |
| 1,485,810 | 3/1924 | Parker et al. | 264/74 |
| 3,219,735 | 11/1965 | Iverson et al. | 264/74 |
| 3,396,067 | 8/1968 | Schafer | 428/330 |
| 3,634,179 | 1/1972 | Anderson | 264/73 |

*Primary Examiner*—James H. Derrington

[57] ABSTRACT

A synthetic onyx material and method of preparation having veined coloring marks, within a matrix, in a smoothly flowing, variegated pattern resembling the flow of colored contaminants in natural onyx; the patterns are in juxtaposed portions revealing an optical boundary.

5 Claims, 3 Drawing Figures

SYNTHETIC ONYX AND METHOD

This is a continuation, of application Ser. No. 965,078, filed Nov. 30, 1978 now abandoned.

BACKGROUND OF THE INVENTION

1. Field of the Invention

The invention relates to plastic materials as used for manufacturing wall panels, sinks, bathtubs, furniture and other decorated articles and structural materials. More particularly, the invention relates to an improved synthetic onyx material used for such articles and materials. The onyx is synthesized from a plastic composition having patterns characterized as smoothly flowing, wavy and variegated to present a pleasing esthetic appearance 2. Prior Art Synthetic Onyx In the past, so-called synthetic or simulated onyx is subject to a number of disadvantages. The physical appearance does not, in fact, truly approximate or closely resemble natural onyx. Most particularly, the difference lies in the failure of prior art materials to present the coloring in a smooth flow pattern characteristic of such natural materials, and is therefore esthetically less pleasing. Further, articles formed of prior art synthetic onyx from plastic materials have not, at this point, proved reliable in that they are subject to crazing, cracking and other difficulties which undermine the usefulness of the material for such applications as wall panels, sinks and bathtubs.

In U.S. Pat. No. 3,396,067, entitled "Resinous Product-Simulating Onyx", issued Aug. 6, 1968 to Kenneth A. Schafer and assigned to Mira Chem, Inc., a simulated, plastic onyx material is described and illustrated purporting to provide a material useful in the manufacture of decorative articles designed for providing the appearance of synthetic or simulated onyx. While the product described in U.S. Pat. No. '067 is subject to the disadvantages outlined above, U.S. Pat. No. 3,396,067 is hereby expressly incorporated herein by reference to be an integral part of this disclosure and specification.

It is to be noted in the description of specific examples of preparation of the composition according to the '067 patent, the composition in the form of a liquid or paste is uniformly cast on a mold and allowed to cure. The resultant product, however, has a transparent matrix. The embedded coloring material is opaque and striated in clearly delineated lines or streaks. It is not esthetically pleasing in that it does not resemble the natural color flow marks to be found in, for example, natural onyx. It is further noted that in the '067 patent, the resin mixture, including the striated coloring material, is applied uniformly to the surface of the mold, the coloring material fails to flow substantially, thereby creating the undesirable affect noted above.

It is noteworthy that in the present invention, a relatively higher percentage of resin is preferably utilized, giving rise to a much greater reliability in the final product. The product of the present invention is extraordinarily reliable and has proven to be free of cracking and crazing.

SUMMARY OF THE INVENTION

The synthetic onyx of the invention as applied, for example, to a manufactured article such as a sink is prepared by spraying the surface of a mold with a gel coat to provide a hard transparent coating of glaze.

After the glaze coating is dry to the touch, a mixture of clear, liquid, casting resin is prepared with a dual promotion catalyst mixture. A filler of fine and coarse alumina particles is mixed with the resin-catalyst mixture to form a paste to provide a matrix, such that the resin is 25%-75% by weight of the matrix. The resin is typically 33%-50% in proportion by weight of the matrix. Coloring material is mixed with clear liquid resin to reduce the viscosity of the coloring material. The coloring material is then applied to cover substantially the top surface of the matrix. The surface coloring material is depressed substantially into the matrix, preferably using a flat instrument at an angle. Separate portions of the depressed matrix are placed in mounds on the glaze mold. The mounds are separated from each other. The resin-filler paste is placed on top of each of the mounds such that the amount and number of mounds are sufficient substantially to cover the mold with an even coating after flowing. The mold and coating are vibrated so that the pyramided mounds tend to liquify and flow together to form an optical, visible boundary evenly covering the mold surface. The coating is then allowed to dry and harden. The resultant product has a pleasing appearance with coloring material formed in veins within said matrix in a smoothly flowing, variegated pattern, tending to resemble the flow of colored contaminants in natural onyx, against a contrasting background.

DETAILED DESCRIPTION OF THE INVENTION

What follows is a description of the preferred embodiment and method of the invention, taken in connection with the accompanying drawings, and its scope will be defined in the appended claims.

IN THE DRAWINGS

Figure 1:
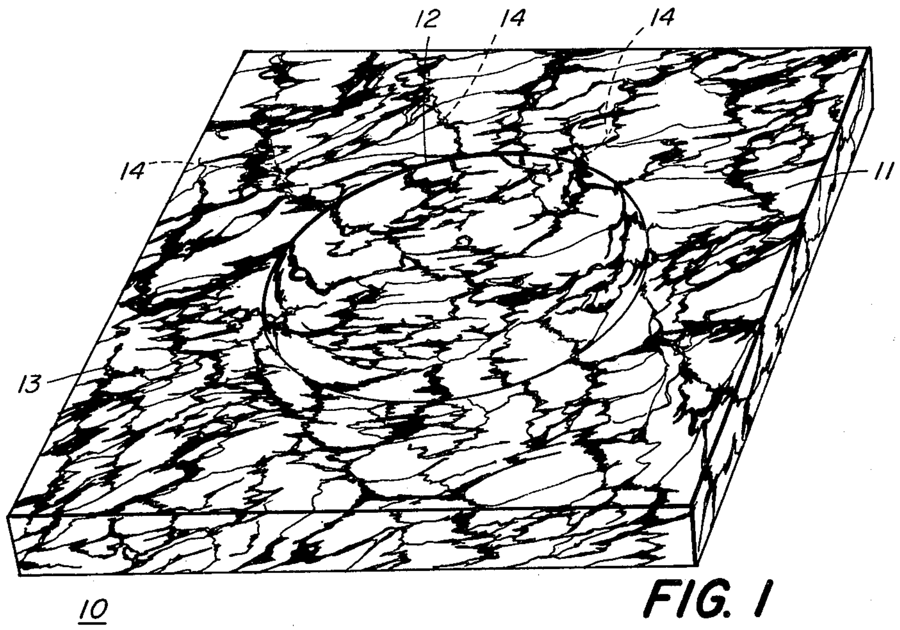
FIG. 1 is a perspective view of a sink made in accordance with the present invention.

Referring now to the drawings, and with particular reference to FIG. 1, there is here illustrated a sink manufactured in accordance with the present invention. The sink is generally indicated at 10 and has a deck 11 with a bowl 12. The background of the sink is generally translucent of a selected shade, e.g., whitish or greenish. Veins 13 of color contrast with the background and smoothly flow through the deck 11 and the bowl 12. The colored flow marks are bounded within areas delineated by dotted lines at optical boundaries 14.

Figure 2:
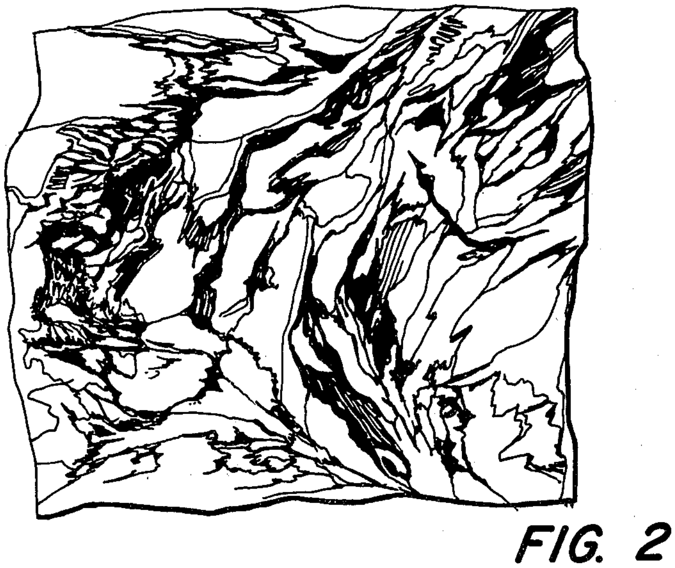
FIG. 2 is an enlarged plan view of a surface fragment of the sink in FIG. 1.

In the plan view of a fragment in FIG. 2, one can more clearly see the affect of the veins 13 in the sink material, the smoothly flowing, variegated pattern resembling the flow of colored contaminants in natural minerals.

Figure 3:
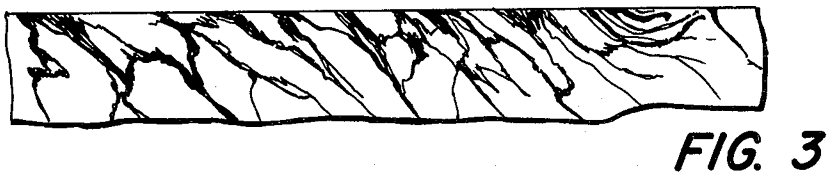
FIG. 3 is a side, fragmentary view, partially in section, showing the coloring pattern of the material in FIG. 1.

In the side view of FIG. 3, shown partially in section, a fragment of the deck 11 is shown. The depth of the veins 13 of color within the matrix is shown.

THE METHOD OF THE INVENTION

In accordance with the invention, a mold, formed with a surface that is the complement of the sink, is sprayed with a gel coat approximately 0.5 millimeters thick to provide a coating of glaze.

After the glaze coating is dry to the touch, a mixture of clear liquid casting resin is prepared with a dual promotion catalyst mixture. The resin is preferably an alkyd resin, such as Silmar Polyester Resin S-40 or S-41 described in technical bulletins and manufactured by the Silmar Division of Vistron Corp., 12335 S. Van Ness Ave., Hawthorne, Calif. 90250. The technical bulletins describing S-40 and S-41 and published by Silmar are incorporated herein by reference. Useful results are obtainable with thermosetting resins in the form of a liquid.

For about 45 pounds of liquid resin, 55–90 c.c. of polymerization catalysts in proportion, ranging from 1:1 to 2:1 by weight of curer to initiator is used. The proportion of curer to initiator varies with ambient temperature and humidity. The curer preferably used is a clear, colorless solution of methyl ethyl ketone peroxide MEK in a plasticizer base, such as NOROX® FS-100, manufactured by The Norac Company, Inc., 405 South Motor Avenue, Post Office Box F, Azusa, Calif. 91703.

The preferred initiator is a clear colorless solution of a ketone peroxide in a plasticizing base, such as NOROX® AZOX manufactured by Norac. FS-100 and AZOX are described in technical bulletins published by Norac and incorporated herein by reference.

The preferred filler of hydrated alumina particles, typically white, in the form of a mixture of fine and coarse particles, is mixed with the resin liquid in such a proportion as to form a paste to provide a matrix, such that the resin is preferably 30%–50% of the matrix.

The filler particles used preferably are hydrated aluminas such as RH-31 and RH-35, manufactured by Chemical Division, Reynolds Metals Company, P.O. Box 27003, Richmond, Va. and described in technical bulletins published by Reynolds. Typically particles are used in a ratio of 2:1 of HR-35 to HR-31 proportion by weight. 32% of HR-31 is between 100 and 325 mesh, the rest below 325. 85% of HR-35 is between 100 and 325 mesh, the rest below 325. Other filler particles may be used such as silica, glass and both inorganic and organic filler materials.

Coloring materials are used, such as manufactured by Pigment Dispersions, Edison, N.J. They may also be prepared from a pigment powder, as manufactured by Polychrome Dispersions, Gardena, Calif., and mixed with resin.

The coloring material is then applied to the top surface of the matrix. The surface coloring material is then depressed substantially into the matrix at an angle of 30°–90°. The degree of depression is a matter of choice. Separate portions of the colored matrix are placed in mounds on the glazed molds. The mounds are separated from each other and spaced sufficiently to allow a substantial amount of flow. The remaining matrix in a predetermined container is pyramided on top of the mounds sufficiently to cover the mold with an even coating after flowing of the mounds. The mold is then vibrated to reduce the viscosity of the mounds and allow them to flow together until they reach an optical boundary and form an even colored matrix covering the surface of the mold. The matrix is then allowed to cure until it is hard to the touch.

It will be apparent that synthetic onyx formulated in accordance with the invention in the form of suitable articles of manufacture such as sinks, wall panels and bathtubs represent a significant improvement over prior art synthetic onyx articles, both decoratively and in terms of reliability.

While there has hereinbefore been described what is now considered to be the preferred embodiment and method of the invention, it will be apparent that many modifications and changes will be made thereto without departing from the true scope of the invention. All such changes and modifications, therefore, are deemed to be a part of this invention.

What is claimed is:

1. The method of preparing decorative material, comprising:

(A) preparing a matrix of a mixture of filler particles, polymerizable resin and polymerization catalyst, tending to polymerize said resin,;

(B) depressing coloring material into said matrix;

(C) placing separate portions of said colored matrix in mounds on the surface of a mold, said mounds being separated from each other;

(D) vibrating said mounds to cause them to flow together, said matrix portions extending over said mold surface; and (E) allowing said extended matrix to harden to produce said decorative material with colored markings formed in veins within said matrix in a wavy, smoothly flowing, variegated pattern contrasting with said matrix.

2. The method of claim 1, wherein:

a gel coat is sprayed on the mold.

3. The method of claim 1, wherein:

said filler is formed from a finely divided powder.

4. The method of claim 3, wherein:

said filler is substantially formed from hydrated alumina particles less than 100 mesh size, with a greater proportion in the range of mesh 100 to mesh 325 and a substantial proportion less than mesh 325.

5. The method of claim 3, wherein:

said powder includes glass particles.

* * * * *